2 Sheets—Sheet 2.
J. G. BODEMER.
INDIRECT-ACTING GOVERNOR.
No. 176,591. Patented April 25, 1876.
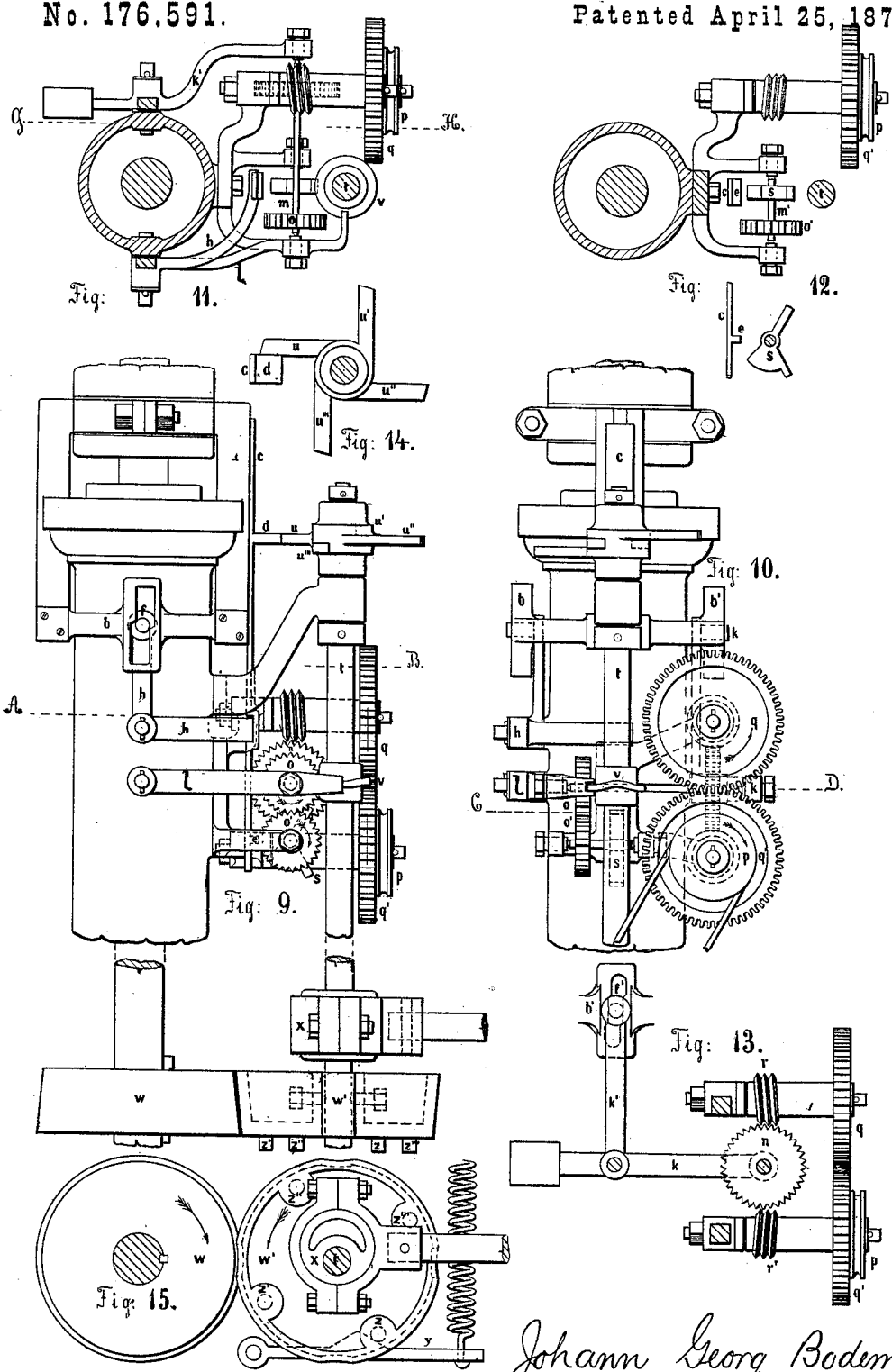
Witnesses
Ellwood T. Doty
Harry Smith
Johann Georg Bodemer
by his Attorneys
Howson & Son

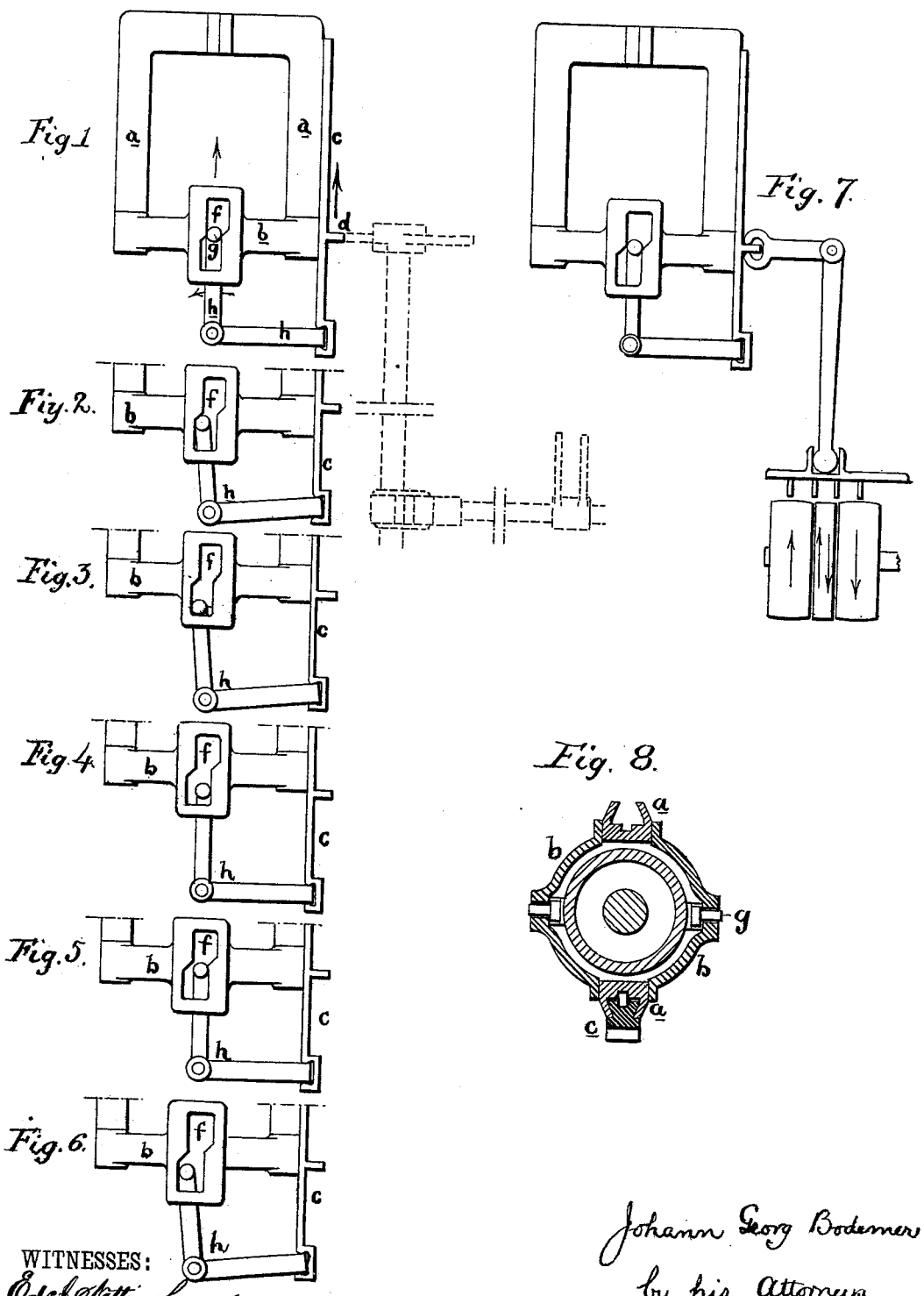

UNITED STATES PATENT OFFICE

JOHANN GEORG BODEMER, OF ZSCHOPAU, SAXONY, GERMANY.

IMPROVEMENT IN INDIRECT-ACTING GOVERNORS.

Specification forming part of Letters Patent No. 176,591, dated April 25, 1876; application filed January 15, 1876.

*To all whom it may concern:*

Be it known that I, JOHANN GEORG BODEMER, of Zschopau, Saxony, Germany, have invented certain Improvements in Governors, of which the following is a specification:

The object of the present invention is to reduce to a minimum the variations in speed consequent upon a disturbance of the equilibrium between force and resistance.

A governor which is to fulfill this object should answer the following conditions: First, it must put the regulator into immediate action in the required direction as soon as the governor-balls deviate but little from their normal position; second, it should keep the regulator in action in the same direction as long as the balls continue to rise; third, it should put the regulator completely out of action as soon as the governor-balls have commenced to recede toward the normal position, as the valve will in general be found to be in the proper position although the normal speed is not yet attained; fourth, it should keep the regulator out of action while the balls are receding farther toward their normal position; fifth, it must cause the regulator to renew its action in the original direction in case the balls should begin to increase their deviation from the normal position before having arrived at the same.

The above conditions are fulfilled by the mechanism which I will now proceed to describe, reference being had to the accompanying drawings, in which—

Figures 1 to 6, Sheet 1, are diagrams, illustrating my invention; Fig. 7, a view of a modification; and Figs. 8 to 13, Sheets 1 and 2, views of my improved governor.

I will first proceed to explain the principle of my invention on which the operation of the governor is based, and which is illustrated in Figs. 1 to 6.

To the yoke $a$ of the governor is attached the piece $b$, having a cam-slot, $f$. With a yoke, $a$, a sliding bar, $c$, works together by friction, preferably in the manner shown in the sectional plan, Fig. 8, in which instance the bar $c$ is attached to $a$ by means of a dovetailed feather, working in a corresponding groove, a spring serving to cause the necessary amount of friction. $h$ is a lever, the pin $g$ at the upper end of which projects into the slot $f$, while the lower arm of the same is embraced by a bend at the lower end of the bar $c$.

It is to be observed that the slot $f$ is wider than the diameter of the pin $g$, and that it is so shaped that those parts of the outline of the same which lie nearer to the center line have a distance from the latter equal to the radius of the pin. Fig. 1 shows the parts alluded to in their mean position.

The regulator which I prefer to use in connection with my governor is composed of the ordinary fast pulley and loose pulleys and a belt-shifter, through the medium of which the regulating-valve is opened or closed, according to which of the two belts is transferred from its loose to the fast pulley. This belt-shifter is controlled from the friction-bar $c$, preferably through the medium of the mechanism hereafter described in connection with Fig. 9, the projection $d$ on the bar in that case arresting the belt-shifter in its different positions, according to the position the governor causes the bar $c$ to assume. If desirable, however, the projection $d$ may be directly connected to the belt-shifter by means of the bell-crank lever shown in the modification, Fig. 7.

Upon a decrease of resistance the balls of the governor, and consequently the yoke $a$, with the part $b$, will rise, the bar $c$ will be taken along with the latter by friction, and the lever $h$ is shifted until the pin $g$ touches the left-hand side of the slot $f$, whereby it is arrested. (See Fig. 2.) At this position the belt, through the mechanism hereafter described, has already been completely shifted onto the fast pulley; the regulator is consequently put into immediate action, according to the requirement of the first condition. The governor rising farther, the yoke $a$ rises with it, (see Fig. 3,) but the bar $c$, being arrested by the resistance which the pin $g$ finds in the slot $f$, and which overcomes the friction between $c$ and $a$, will remain in its place; therefore the belt remains in the same position as required by the second condition. But as soon as the governor begins to descend, the yoke immediately moves the bar $a$ until the pin $g$ comes into contact with the right-hand side of the slot $f$. At this moment the normal position of the bar $c$, as well as that of the belt-shifter, is attained, and the regulator is stopped. This position, corresponding to the third condition, is shown in Fig. 4. Condition No. 4 is fulfilled by the position of the bar $c$ remaining unaltered by any farther descent of the governor toward its mean position, as the right-hand side of the slot $f$ continues to arrest the pin $g$, and to present a resistance against the downward pressure on the bar, Fig. 5. Should the governor rise again from its last position, the bar $c$ will immediately shift the pin $g$ toward the left and cause the regulator to again operate a closing of the valve, Fig. 6, as required by the fifth condition.

Having thus explained the main principle on which my governor is based, I will proceed to describe more minutely the operation of the governor and the intermediate mechanism through which the belt-shifter is controlled.

Fig. 9, Sheet 2, is a side view; Fig. 10, a front view. Figs. 11 and 12 are horizontal sections, respectively on the lines A B and C D. Fig. 13 is a section on the line G H of Fig. 11. Fig. 14 is a plan view of part of the mechanism; and Fig. 15, plan of the friction-sheaves, &c. The construction of the yoke $a$, the piece $b$, the bar $c$, and the lever $h$ is the same as that shown in the diagrams, Figs. 1 to 6.

The bar $c$, as before mentioned, arrests, by its projection $d$, the rotation of the shaft $t$. The latter bears at its lower end a friction-sheave, $w'$, with which another friction-sheave, $w$, fixed on the spindle of the governor, is in contact. The sheave $w'$ has on its circumference four shallow concave recesses, the positions of which correspond with the four arms $u$, $u'$, $u''$, and $u'''$, at the top of the shaft $t$. If one of these recesses is turned toward the sheave $w$, the sheave $w'$ is at rest. On the latter there are four pins, $z$, $z'$, $z''$, and $z'''$, on which the lever $y$ and its spring act in such a manner that the sheave tends to turn in the direction of the arrow. In the position shown in the drawing it is, however, prevented from moving by the arm $u$. On the outer end of the rod of the eccentric $x$, operated by the shaft $t$, is the belt-shifter by which the regulator is put in or out of action. The governor-balls rising from their mean position, the projection $d$ of the bar $c$ ascends and releases the arm $u$. At the same moment the lever $y$, pressing on the pin $z$, shifts the sheave $w'$ so far forward that $w$ engages with the corresponding part of the full periphery of $w'$, and turns this sheave a quarter of a circle. At the same time the eccentric moves to the same extent, and puts the regulator into gear for closing. Consequently the operation of the latter commences as soon as the yoke $a$ and the bar $c$ have risen to the amount of the thickness of the projection $d$.

When the second recess in the sheave $w'$ arrives opposite to the sheave $w$, the cam $u'$, placed higher than the cam $u$ to the amount of the thickness of the projection $d$, is arrested by the latter, and the belt-shifter is consequently arrested also; but since the bar $c$ is prevented by the pin $f$ from rising farther, the governor may now continue to rise without altering the operation of the regulator. Upon the descent of the governor from a point above the mean position, the projection $d$ descends and releases the arm $u'$, the shaft $t$ turns again a quarter of a circle, and the regulator is put out of action. A farther descent toward the normal position does not affect the regulator; but a renewed ascent will cause the same to be put into operation again for closing the valve, the shaft $t$ having to make three-quarters of a revolution in this case. The action of the governor below its mean position is similar to that described, but in an inverse direction.

If it is desired to make the governor still more sensitive to the variations in power or resistance, the following additional mechanism may be employed: On the back of the yoke of the governor the piece $b'$, with the slot $f'$, Fig. 13, is fixed, into which a pin projects without appreciable play. This pin is fixed to the lever $k'$, opposite to the horizontal arm $k$ of which, on the front side of the governor, there is a lever, $l$, embracing with its forked end the edge of a cam-disk, $v$, fixed on the shaft $t$. This disk is of the form shown in Figs. 9 and 10, its alternately raised and depressed portions (with regard to the lever $l$) corresponding with the points of rest of the shaft $t$. Between these two levers $k$ and $l$, and supported by them on conical centers, or in loosely-fitting bearings, a spindle, $m$, revolves. The latter carries the spur-wheel $o$ and the worm-wheel $n$, having teeth parallel with its spindle. $r$ and $r'$ are two worms, the upper with right-hand, the lower with left-hand-thread, which are rotated from the two spur-wheels $q$ and $q'$ in opposite directions. These wheels $q$ $q'$ are driven continuously by a strap running over the pulley $p$. In its normal position the spur-wheel $n$ does not gear into either of the worms $r$ and $r'$. Below the spindle $m$ the spindle $m'$, Fig. 12, turns on fixed centers. This spindle $m'$ bears the spur-wheel $o'$, which gears into the wheel $o$ as long as the latter is in its lower position. On this spindle is also fixed the tappet-disk $s$, (see Fig. 12,) which, having a greater weight on one side, tends to assume the position shown in the drawing, but which, according to the action of other parts, moves the bar $c$ up or down by one of its tappets coming into contact with the projection $e$ of the bar.

The operation of the different parts is as follows: Suppose the governor to have put the regulator out of action on its return from its highest point. If it now stops receding— i. e., if it continues to revolve above its mean position, so that its own speed, and that of the motor are yet too high—the renewed action of the regulator for the further closing of the valve has to be caused by the additional mechanism described. In this high position the lower part of the slot $f'$ in the piece $b'$, Fig. 13, has shifted the lever $k'$ toward the left; consequently the lever $k$ is raised, and the spur-wheel $n$ has come into gear with the worm $r$.

On condition that the pulley $p$ turns to the right, the wheel $n$ will revolve to the left. The shaft $t$ is in such a position that the arm $u''$ bears against $d$. Therefore one of the depressions of the disk V is in front of Fig. 9, or toward the left in Fig. 10, and consequently the wheel $o$ is in gear with the wheel $o'$. The lower tappet of $s$ must, therefore, rise to push the bar $c$ upward, so that the projection $d$ slides past the arm $u''$. The shaft $t$, in consequence, turns, and in this case three-quarters of a revolution, as it is not arrested before $u'$ strikes on $d$. Meanwhile the eccentric $x$ has started the regulator for the opening of the valve, but immediately after the shaft has made the eccentric pass over its point of rest to the position for closing. As the arm $u'$ is in contact with the projection $d$, a raised portion of the disk V in Fig. 9 is in front, the lever $l$ is lifted, the wheel $o$ is out of gear with $o'$, and the tappet $s$ is caused to return into the position, as shown in Fig. 12 of the drawing, on account of its center of gravity being on one side. The regulator will now continue to close the valve until the governor has again descended to a certain position, and the starting of the same will be repeated until the governor has reached its mean position.

It may be observed that the spindle $m$, on being raised or lowered on one side or the other, will be at a slight angle; but the deviation is too small to be prejudicial.

The slot $f$ corresponds with the center line for its middle part. The correcting arrangement will, therefore, not be put into operation at a slight deviation of the governor from its mean position.

In case of the continuation of a too low speed the worm $r'$ with left-hand thread comes into action. According to the drawing, this worm acts on the same worm-wheel as the right-hand threaded worm $r$. This is accomplished by reducing the thickness of the worm-wheel $n$ and making its teeth parallel with the spindle $m$. This construction may be objected to; but by applying two worm-wheels close to each other, and by shifting the worms slightly, the one to the right, the other to the left, this objection may be overcome.

It will be evident that the intermediate belt-gearing and fast and loose pulleys may be dispensed with, and the slide $c$, Fig. 1, be placed in immediate connection with the valve to be governed.

I claim as my invention—

1. The combination of the yoke $a$ of the governor, having a slot, $f$, by which the lever $h$ is controlled, with the bar $c$, connected to the said yoke by friction, and from which the valve is controlled, as set forth.

2. The combination of the sheave $w$ on the shaft of the governor with the sheave $w'$, eccentric $x$, and arms $u$ $u'$ $u''$ $u'''$ on the shaft $t$, and with the projection $d$ under the control of the governor, all substantially as described.

3. The combination of the shaft $t$, operated by friction from the governor, and having the arms $u$ $u'$ $u''$ $u'''$ and the cam-disk $v$, with mechanism substantially as described, through which the tappet $s$ is caused to act on the bar $c$, as and for the purpose set forth.

In testimony whereof I have signed my name to this specification in the presence of two subscribing witnesses.

JOHANN GEORG BODEMER.

Witnesses:
C. D. CARSTENS,
ROBT. R. SCHMIDT.